Oct. 14, 1969     N. G. MUSKOVAC     3,473,101

PROPORTIONAL FIRING CIRCUIT

Filed Aug. 13, 1968

3,473,101
PROPORTIONAL FIRING CIRCUIT
Nicholas G. Muskovac, Rockville, Md., assignor to Sprague Electric Company, North Adams, Mass., a corporation of Massachusetts
Continuation-in-part of application Ser. No. 539,022, Mar. 31, 1966. This application Aug. 13, 1968, Ser. No. 752,290
Int. Cl. H02k 27/20; H02p 5/00
U.S. Cl. 318—334                                     9 Claims

ABSTRACT OF THE DISCLOSURE

Phase of trigger pulses derived from the switching of a square core transformer is controlled by a condition responsive impedance included in the transformer secondary so as to provide proportional firing of a control rectifier. The secondary is electrically insulated to provide isolation of the impedance.

Cross references to related applications

The present application is a continuation-in-part of copending application S.N. 539,022, now Patent No. 3,417,320, filed in the name of Nicholas G. Muskovac on Mar. 31, 1966.

Background of the invention

This invention pertains to proportional firing circuits and more particularly to a simplified sensor controlled proportional firing circuit for control rectifiers and the like.

Proportional firing of control rectifiers, such as thyristors and triacs, is highly useful in modern electronics for control of both power and voltage delivered to a load. Voltage control, for example, is advantageously used with voltage sensitive loads, such as for motor speed control and the like. Prior art circuits, however, are often complicated systems requiring a large number of components, and are not economically suited for many applications. Moreover, such circuits generally fail to provide electrical isolation of the sensor.

It is an object of this invention to provide a low cost proportional firing circuit having a minimum number of components.

It is another object of this invention to provide a sensor controlled proportional firing circuit.

It is a further object of this invention to provide proportional firing of a control rectifier by varying the phase of trigger pulses derived from a sensor controlled switching of a square core transformer.

It is a still further object of this invention to provide an economical proportional firing circuit for control of motor speed in accordance with an environmental condition.

It is a further object of this invention to provide a proportional firing circuit in which the phase angle of gate pulses derived from switching of a square core transformer is determined by the impedance of a sensor which is electrically isolated from the circuit.

Summary of the invention

A firing circuit for proportionally controlling the application of energy to a load from a source of alternating current in accordance with the invention comprises at least one control rectifier in series connection with said load, a gate circuit connected to the gate electrode of said rectifier for generating and applying triggering pulses thereto, said gate circuit including an energy storage means and a square core transformer, said transformer having a primary and a secondary winding, said storage means connected in parallel to said source and said primary for providing trigger pulses therein upon saturation of said core, said primary coupled to said gate, and said secondary winding having a variable impedance for altering the saturation time of said transformer so as to provide a variation in phase of said trigger pulses.

Description of the preferred embodiment

Figure 1:
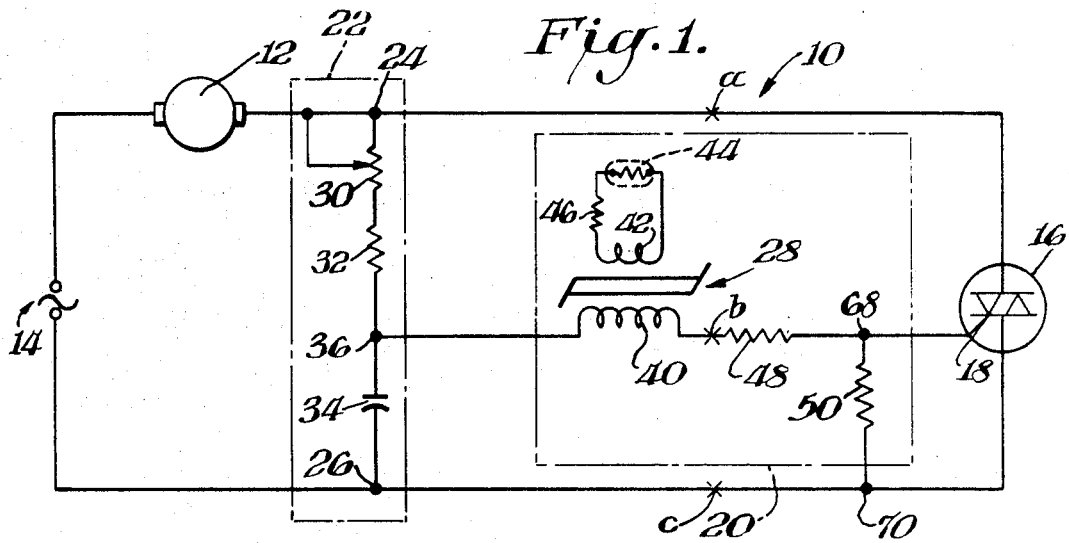
FIGURE 1 is a schematic view of a circuit for proportional firing of a triac in accordance with the invention.

In FIGURE 1 is shown a firing circuit 10 for proportionally controlling the current and voltage applied to load 12 from an alternating current source 14. A triac 16, or the like, is provided in series with load 12 and across source 14. Trigger pulses are supplied to gate electrode 18 of triac 14 from a gate trigger circuit 20 which is energized by a phase-shift network 22.

Network 22 which is connected across source 12 at junctions 24 and 26, provides a constant lag of the phase angle of voltage delivered to gate circuit 20. Network 22 consists of a resistive portion made up of potentiometer 30 and resistor 32 in series with a reactance provided by capacitor 34. The output of network 22 is taken from junction 36 which is provided between resistor 32 and capacitor 34. Potentiometer 30 provides an adjustment of the phase angle input to gate circuit 20, and capacitor 34 functions as both the reactive element of phase shift network 22 and as an energy storage means which provides a sharp trigger pulse upon saturation of transformer 28.

Transformer 28 is a square core transformer having a primary winding 40 and a secondary winding 42. Winding 40 is connected in series between phase shift network 22, at junction 36, and gate electrode 18 whereas winding 42 is serially connected to a limiting resistance 46 and a condition responsive impedance or sensor 44 such as a thermistor or the like. A limiting resistor 48 is included in series between winding 40 and gate 18, and a resistor 50, connected between junction 68 and junction 70, shunts the gate-to-cathode of triac 16.

Resistor 50 also connects to phase shift network 22 at junction 26 so that primary 40 is in parallel with capacitor 34. Thus at saturation or switching of the core, primary 40 and resistors 48, 50 provide a low impedance path across capacitor 34 which dumps its stored energy thereby providing a narrow trigger pulse at gate electrode 18.

Advantageously, secondary winding 42 may be electrically insulated from transformer 28 and the rest of the circuit, in which case, sensor 44 is isolated from source 14 and is subjected only to low voltages magnetically induced by transformer 28.

Since transformer 28 has a square core and thus a generally rectangular hysteresis loop, it magnetically saturates at a specific volt-second input. Thus the voltage time area of the transformer pulse remains constant such that the time of saturation or switching of the core varies in time in accordance with the total impedance of the secondary circuit which includes winding 42, sensor 44 and resistor 46. Hence any change in impedance of sensor 44, which may be a positive temperature coefficient thermistor or the like, results in a shift in the phase of saturation which, in turn, provides pulses of varied time intervals to the triac gate.

In other words, each time the core is switched the circuit operates to dump the energy stored in capacitor 34, and the phase of the trigger pulse generated by the dumping of capacitor 34 is varied in accordance with the time of core switching. This phase varies with the length of the pulse of the transformer which is determined by the sensor controlled impedance of the secondary winding.

Figure 2:
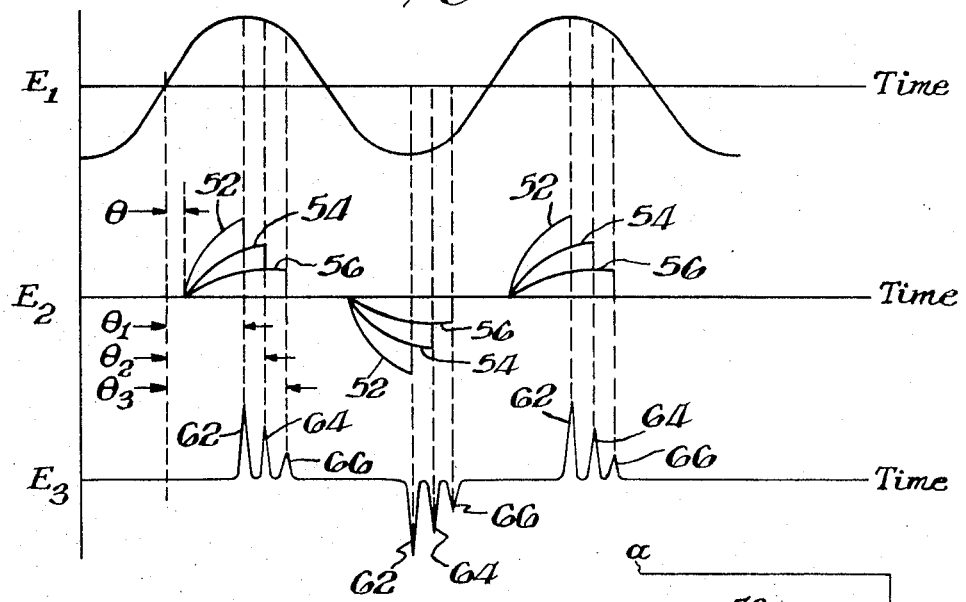
FIGURE 2 is a schematic diagram of voltages produced at different points in the circuit of FIGURE 1.

The relative magnitude and phase of voltage pulses derived in the circuit are shown in FIGURE 2 wherein the source voltage E1, transformer voltage E2 and gate voltage E3 are plotted against time. Three transformer pulses 52, 54 and 56, and three gate pulses 62, 64 and 66, are shown in E2 and E3 respectively for each half cycle of AC as plotted in E1.

Pulses 52, 54 and 56 represent the transformer voltage for three different impedance values of sensor 44. The phase angle $\theta$ of these pulses (measured from the start of the pulse) is constant since this is set by phase shifter 22.

The voltage-time area of pulses 52, 54 and 56 is constant due to the square core, and their voltage and length is dependent upon the impedance of sensor 44. Thus, when sensor 44 is low in impedance (for example, a positive temperature coefficient thermistor at low temperature) the impedance of transformer 28 is low, its voltage magnitude is low, and its pulse is long as shown at 56. Conversely with a high impedance value for sensor 44, the voltage is high and the pulse is short as represented by pulse 52. At saturation of the transformer, which corresponds to the fall or decay of transformer pulses 52, 54 and 56, sharp trigger pulses 62, 64 and 66 (shown at E3) are formed across resistor 50 due to the dumping of the stored energy of capacitor 34. These trigger pulses vary in phase from $\theta_1$ to $\theta_3$ in accordance with sensor impedance.

Resistor 50 is chosen to dissipate or swamp out the transformer leakage in the early part of the transformer pulse so that the voltage developed between the gate and cathode (junction 68 to 70) is a sharp pulse produced at the instant of core switching.

As illustrated in E3 of FIGURE 2, trigger pulses 62, 64 and 66 vary in both phase and voltage. The voltage change however, is not of primary importance although it does limit the sensor range since some values of sensor impedance may produce a trigger pulse having too low a voltage amplitude; for example, trigger pulses of lower voltage magnitude than pulse 66.

Advantageously this circuit may be utilized in air conditioning units to vary fan speed in accordance with the temperature; for example where load 12 is a fan driven by a permanent split capacitor motor and sensor 44 is a positive temperature coefficient sensor. In this case, low temperatures (reduced sensor impedance) causes late firing in the AC half-cycle (e.g. by pulse 66) and low voltage applied to the motor which results in slow fan speed. On the other hand, high temperatures provide high voltage to the motor and fast speeds. The circuit may also permit continuous operation of the fan at low speeds for improved lubrication etc. The latter would be accomplished in either of two ways: that is by adjustment of potentiometer 30 or by proper selection of resistor 46 so that the motor will still run when the sensor is relatively cold.

Of course, a negative temperature coefficient sensor will provide an opposite reaction at the same temperatures. The latter may be utilized for example in forced air heating units.

An example of suitable values of elements utilized in the circuit of FIGURE 1 for fan speed control of an air conditioning unit is as follows:

Load 12 (Motor) ___ Permanent split capacitor motor such as Emerson K55HXDCD—2085, 230 volt, 3.5 amp, 1100 r.p.m.
Source 14 _____ 230 volts A.C. 60 Hz.
Triac 16 _____ G.E. SC40D.
Transformer 20 ____ 700T/700T on Sprague D696X1–6R–F2 core.
Potentiometer 30 ___ 10K, 2 watt.
Resistor 32 _____ 20K, 2 watt.
Capacitor 34 _____ 1.0 mfd., 250 volt.
Sensor 44 _____ Sprague 1–9010–170 or National Lead Co. #92404.
Resistor 46 _____ 500 to 1000 ohms, selected according to low speed performance required.
Resistor 48 _____ 4.7 ohms, 1 watt.
Resistor 50 _____ 22 ohms, ½ watt.

Motor speeds from 400 r.p.m. to 1000 r.p.m. were maintained over a temperature range from 90° F. to 110° F. with the above circuit. The maximum motor speed is of course dependent upon the phase angle set by network 22 and can be varied accordingly. The minimum motor speed is adjusted by resistor 46, and in the given example, at 90° F. speeds of approximately 400 and 640 r.p.m., respectively, were realized with 500 and 1000 ohms for resistor 46. Of course for more versatile control, a potentiometer or the like may be substituted for resistor 46.

Any control rectifier such as a thyristor or the like may also be utilized with slight modification of the circuit. Thus as shown in FIGURE 3, a pair of thyristors 72, 74 in anti-parallel arrangement may be proportionally fired by connecting the output of primary 40 of the square core transformer 28 to a conventional transformer 76.

Figure 3:
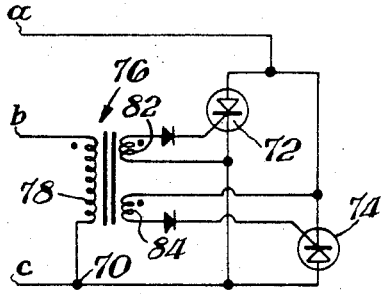
FIGURE 3 is a schematic diagram of a thyristor arrangement suitable for use in the circuit of FIGURE 1.

The circuit portion shown in FIGURE 3 is designed for connection at points *a*, *b* and *c* of the circuit of FIGURE 1. In this case, thyristors 72 and 74 replace triac 16, and transformer 76 replaces resistors 48 and 50. Hence, primary winding 40 is connected in series with primary 78 of transformer 76, and through it to junction 70.

This retains primary 40 across capacitor 34 and provides winding 78 in shunting arrangement to the gate-to-cathode of the thyristors. Consequently, pulses similar to pulses 62, 64 and 66 of FIGURE 2 are produced in primary winding 78 and coupled to thyristors 72, 74 by secondary windings 82 and 84 which are connected to the gate and cathode of respective thyristors. Secondary 82 and 84 each include a diode 86 and 88, respectively, to allow only pulses of proper polarity to be impressed on the thyristors.

The thyristor circuit of FIGURE 3 will operate in a manner similar to the triac circuit of FIGURE 1 with one thyristor being fired at an appropriate point in each half cycle in accordance with the impedance of sensor 44.

Of course, the circuit can be applied to a wide variety of different devices where proportional firing would be useful. It can be utilized with a sensor, as described, or can be utilized with other variable impedance means, such as feedback from the load or the like. Moreover, the circuit can also be utilized for proportional control of power, rather than voltage, or both; such as in electric heating or the like.

What is claimed is:
1. A proportional firing circuit for proportionally controlling the energy applied to a load from an alternating current source, said circuit comprising: at least one control rectifier in series connection with said load and said source; and a gate circuit for generation and application of trigger pulses to the gate electrode of said rectifier for initiation of conduction thereby, said gate circuit including an energy storage means and a square core transformer, said transformer having a primary winding coupled to said gate and said storage means, said storage means connected between the input to said primary and the cathode of said rectifier for providing a trigger pulse upon saturation of said transformer, said transformer having an isolated secondary winding in connection to a condition responsive impedance which varies the time of said transformer saturation and the phase of said trigger pulses in accordance with said condition.

2. The circuit of claim 1 including a phase shift network having a resistive and reactive branch connected in series across said source, said reactive branch includes said energy storage means, and said primary is connected at its input to the junction of said branches.

3. The circuit of claim 2 wherein said secondary winding includes a resistive element connected in series with said condition responsive impedance, and the resistance of said element substantially determines the minimum overall resistance of said winding and the minimum voltage delivered to said load.

4. The circuit of claim 2 wherein said load is a voltage responsive motor whose speed is proportional to the voltage impressed thereon, and the speed of said motor is in accordance with the phase of said trigger pulses.

5. The circuit of claim 2 wherein said impedance is responsive to thermal conditions.

6. The circuit of claim 5 wherein said thermally responsive impedance has a positive temperature coefficient.

7. The circuit of claim 2 wherein said energy storage element is a capacitor.

8. The circuit of claim 7 wherein said rectifier is a triac, and the output of said primary winding is serially connected through a limiting resistor to said gate electrode, and a shunting resistor is connected in parallel from the gate to cathode electrode of said triac.

9. The circuit of claim 7 wherein said rectifier is a thyristor, and said gate circuit includes another transformer having its primary in series connection to said square core primary, and said serially connected primary windings being in parallel connection to said capacitor for providing said trigger pulse in said other primary upon saturation of said square core transformer, and said other transformer having a secondary winding connected to the gate and cathode of said thyristor for coupling of said pulses to said gate.

References Cited

UNITED STATES PATENTS

| | | | |
|---|---|---|---|
| 3,293,523 | 12/1966 | Hutson | 318—345 X |
| 3,348,121 | 10/1967 | Murthy | 323—22 X |
| 3,418,497 | 12/1968 | Sauter et al. | 323—22 X |

ORIS L. RADER, Primary Examiner

R. J. HICKEY, Assistant Examiner

U.S. Cl. X.R.

307—252; 318—345; 323—22, 24